United States Patent
Inoue et al.

(10) Patent No.: US 8,245,802 B2
(45) Date of Patent: Aug. 21, 2012

(54) AUTOMOTIVE HYBRID ENGINE ASSIST SYSTEM

(75) Inventors: Masaya Inoue, Tokyo (JP); Masahiro Iezawa, Tokyo (JP); Hideaki Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 533 days.

(21) Appl. No.: 12/515,154

(22) PCT Filed: Oct. 10, 2007

(86) PCT No.: PCT/JP2007/069744
§ 371 (c)(1),
(2), (4) Date: Jun. 11, 2009

(87) PCT Pub. No.: WO2008/059681
PCT Pub. Date: May 22, 2008

(65) Prior Publication Data
US 2010/0051363 A1    Mar. 4, 2010

(30) Foreign Application Priority Data

Nov. 15, 2006  (JP) ................................ 2006-309246
Mar. 6, 2007   (JP) ................................ 2007-055881

(51) Int. Cl.
*B60W 10/06* (2006.01)
(52) U.S. Cl. .................. 180/65.28; 180/65.27
(58) Field of Classification Search ............. 180/65.275, 180/65.27, 65.21, 65.28, 65.265, 65.31, 65.8, 180/65.23; 123/41.31; 903/930, 904
See application file for complete search history.

(56) References Cited

U.S. PATENT DOCUMENTS

| | | | |
|---|---|---|---|
| 3,676,999 A | 7/1972 | Oldfield | |
| 4,756,377 A | 7/1988 | Kawamura et al. | |
| 5,406,797 A | 4/1995 | Kawamura | |
| 6,177,734 B1 | 1/2001 | Masberg et al. | |
| 6,338,391 B1 * | 1/2002 | Severinsky et al. | 180/65.23 |
| 6,554,088 B2 * | 4/2003 | Severinsky et al. | 180/65.23 |
| 7,104,347 B2 * | 9/2006 | Severinsky et al. | 180/65.23 |
| 7,131,933 B2 * | 11/2006 | Tabata | 477/181 |
| 7,178,327 B2 * | 2/2007 | Miyashita | 60/285 |
| 7,237,634 B2 * | 7/2007 | Severinsky et al. | 180/65.23 |
| 7,392,871 B2 * | 7/2008 | Severinsky et al. | 180/65.28 |

(Continued)

FOREIGN PATENT DOCUMENTS

DE    101 39 526 A1    2/2003

(Continued)

OTHER PUBLICATIONS

Extended European Search Report issued Aug. 3, 2011, in Patent Application No. 11153834.4.

(Continued)

*Primary Examiner* — Hau Phan
(74) *Attorney, Agent, or Firm* — Oblon, Spivak, McClelland, Maier & Neustadt, L.L.P.

(57) ABSTRACT

An automotive hybrid engine assist system that simultaneously mounts both an idling reduction system and an electric motor turbocharging system, and that is small, light, inexpensive, and fuel-efficient. Three-phase power terminals of a generator-motor and a super-high-speed rotary machine are respectively connected to an inverter by a large-current wiring. An electric power direction change-over switch is disposed in a path of the large-current wiring, and switches connection of the inverter to the generator-motor or to the super-high-speed rotary machine.

14 Claims, 12 Drawing Sheets

U.S. PATENT DOCUMENTS

| | | | |
|---|---|---|---|
| 7,455,134 B2 * | 11/2008 | Severinsky et al. | 180/65.28 |
| 7,520,353 B2 * | 4/2009 | Severinsky et al. | 180/65.28 |
| 7,559,388 B2 * | 7/2009 | Severinsky et al. | 180/65.28 |
| 7,597,164 B2 * | 10/2009 | Severinsky et al. | 180/65.27 |
| 7,649,273 B2 * | 1/2010 | Zillmer et al. | 123/41.31 |
| 2001/0039230 A1 | 11/2001 | Severinsky et al. | |
| 2002/0003053 A1 | 1/2002 | Geisse et al. | |
| 2005/0097888 A1 | 5/2005 | Miyashita | |
| 2006/0123784 A1 | 6/2006 | Algrain | |
| 2009/0019852 A1 | 1/2009 | Inoue et al. | |
| 2010/0162686 A1 * | 7/2010 | Miyashita et al. | 180/65.275 |

FOREIGN PATENT DOCUMENTS

| | | |
|---|---|---|
| JP | 1-262324 | 10/1989 |
| JP | 5-33668 | 2/1993 |
| JP | 5-141254 | 6/1993 |
| JP | 5-141254 A | 6/1993 |
| JP | 5 79805 | 11/1993 |
| JP | 9 88619 | 3/1997 |
| JP | 11-332015 | 11/1999 |
| JP | 2001 322439 | 11/2001 |
| JP | 2003 20971 | 1/2003 |
| JP | 2005 146893 | 6/2005 |
| JP | 2005 180291 | 7/2005 |
| JP | 2006 177171 | 7/2006 |

OTHER PUBLICATIONS

Extended European Search Report issued Nov. 9, 2010, in Patent Application No. 07829482.4.

European Office Action mailed Mar. 8, 2012, issued for European Application No. 07 829 482.4.

U.S. Appl. No. 13/382,205, filed Jan. 4, 2012, Inoue, et al.

* cited by examiner

AUTOMOTIVE HYBRID ENGINE ASSIST SYSTEM

TECHNICAL FIELD

The present invention relates to an automotive hybrid engine assist system that has both a turbocharger that can be driven by an electric motor and an idling reduction system that uses a generator-motor.

BACKGROUND ART

Conventionally, an idling reduction system has been proposed that generates electric power when a vehicle is in motion by driving an alternator using rotational torque from an engine that is transmitted by means of a belt, and that restarts the engine when the vehicle is stopped by supplying electric drive power to operate the alternator as a motor (see Patent Literature 1, for example).

An electrically-powered motor turbocharging systems have also been proposed in which a super-high-speed rotary machine (a motor) and a turbine that is driven by exhaust gas are disposed so as to be coaxial with a compressor that compresses intake gas to solve a lag in boost pressure in a low-speed rotation range of a turbocharger when an attempt is made to obtain high output by compressing engine intake air using the turbocharger (see Patent Literature 2, for example).

Patent Literature 1: Japanese Patent Laid-Open No. 2005-328690 (Gazette)

Patent Literature 2: Japanese Patent Publication No. 2005-500452 (Gazette)

DISCLOSURE OF THE INVENTION

Problem to be Solved by the Invention

However, although effects can be expected from both the idling reduction system and the electric motor turbocharging system with regard to points such as improved fuel consumption and size reductions for internal combustion engines, they have only been mounted to some vehicles, and have not become widespread. Specifically, in order to mount the idling reduction system and the electric motor turbocharging system to a vehicle, it is necessary to dispose a motor and an inverter inside a cramped automotive engine compartment, causing problems of space and cost.

In particular, a low-voltage (12 V) battery is used in automobiles, but both the idling reduction system and the electric motor turbocharging system are predominantly used instantaneously, and maximum instantaneous power of approximately 3 to 4 kVA is required in order to achieve a predetermined performance. Because of this, the quantity of current in the inverter and electric wiring is a large current in a 300 A class.

A 300 A class inverter means an increase in size for the idling reduction system in particular, and since the total amount of time it is used is limited to instants of restart from idling, another problem has been that the availability factor relative to tens of thousands of hours of service life of the vehicle is extremely low considering the high cost, reducing cost merit.

Because large 300 A class currents of this kind are required by both the idling reduction system and the electric motor turbocharging system, voltage drops due to the wiring also cannot be ignored, and since wiring cross-sectional area must be increased if attempts are made to ensure sufficient electric power, space occupied by the wiring has also been a problem.

On the other hand, while vehicles that are mounted with diesel engines have gradually increased in recent years due to higher thermal efficiency, thorough pursuit of fuel consumption is in demand such as increasing turbocharger size, and also stopping idling, etc., with the aim of further improving fuel consumption.

Consequently, there is demand for mounting both the idling reduction system and the electric motor turbocharging system, but with simple combinations of the above conventional examples, as mentioned above, installation space for large-current inverters and distribution cables for the battery and each of the inverters is required for both the idling reduction system and the electric motor turbocharging system, making mounting of both the idling reduction system and the electric motor turbocharging system difficult in practice with regard to vehicle mountability, weight, cost, etc.

The present invention aims to solve the above problems and an object of the present invention is to achieve an automotive hybrid engine assist system that enables space saving of installation space for simultaneously mounting both an idling reduction system and an electric motor turbocharging system, and that also simplifies wiring between devices, and is small, light, inexpensive, and fuel-efficient.

Means for Solving the Problem

In order to achieve the above object, according to one aspect of the present invention, there is provided an automotive hybrid engine assist system characterized in including: a generator-motor that is coupled to an internal combustion engine so as to act as a starter motor to start the internal combustion engine during starting of the internal combustion engine, and so as to be driven by the internal combustion engine to generate three-phase alternating-current power after starting of the internal combustion engine; a battery that constitutes a power source for a direct-current load and for starting; a turbocharger that has: a compressor that is disposed in an induction system of the internal combustion engine, and that compresses intake gas; a turbine that is mounted coaxially onto a rotating shaft of the compressor, that is disposed in an exhaust system of the internal combustion engine, and that is driven by exhaust gas; and a rotary machine that is mounted coaxially onto the rotating shaft; an inverter that is connected by means of wiring to three-phase power terminals of the generator-motor and three-phase power terminals of the rotary machine, and that converts the three-phase alternating-current power that is generated by the generator-motor into direct-current power and supplies the direct-current power to the battery when connected to the generator-motor, and that converts direct-current power from the battery into three-phase alternating-current power and supplies the three-phase alternating-current power to the rotary machine when connected to the rotary machine; and an electric power direction change-over switch that is disposed in a path of the wiring, and that switches connection of the inverter to the generator-motor or to the rotary machine.

EFFECTS OF THE INVENTION

According to the present invention, an electric power direction change-over switch is used to switch connection of an inverter to a generator-motor or to a rotary machine so as to enable the generator-motor and the rotary machine of a turbocharger to share a single inverter. Thus, the number of inverters can be reduced, installation space for the inverter and wiring space between the inverter and the battery can be saved, and weight can be reduced, vehicle mountability improved, and costs also reduced. The rotary machine of the turbocharger can also be made to work as a generator using exhaust gas, enabling improvements in fuel consumption.

BEST MODE FOR CARRYING OUT THE INVENTION

Embodiment 1

Figure 1:
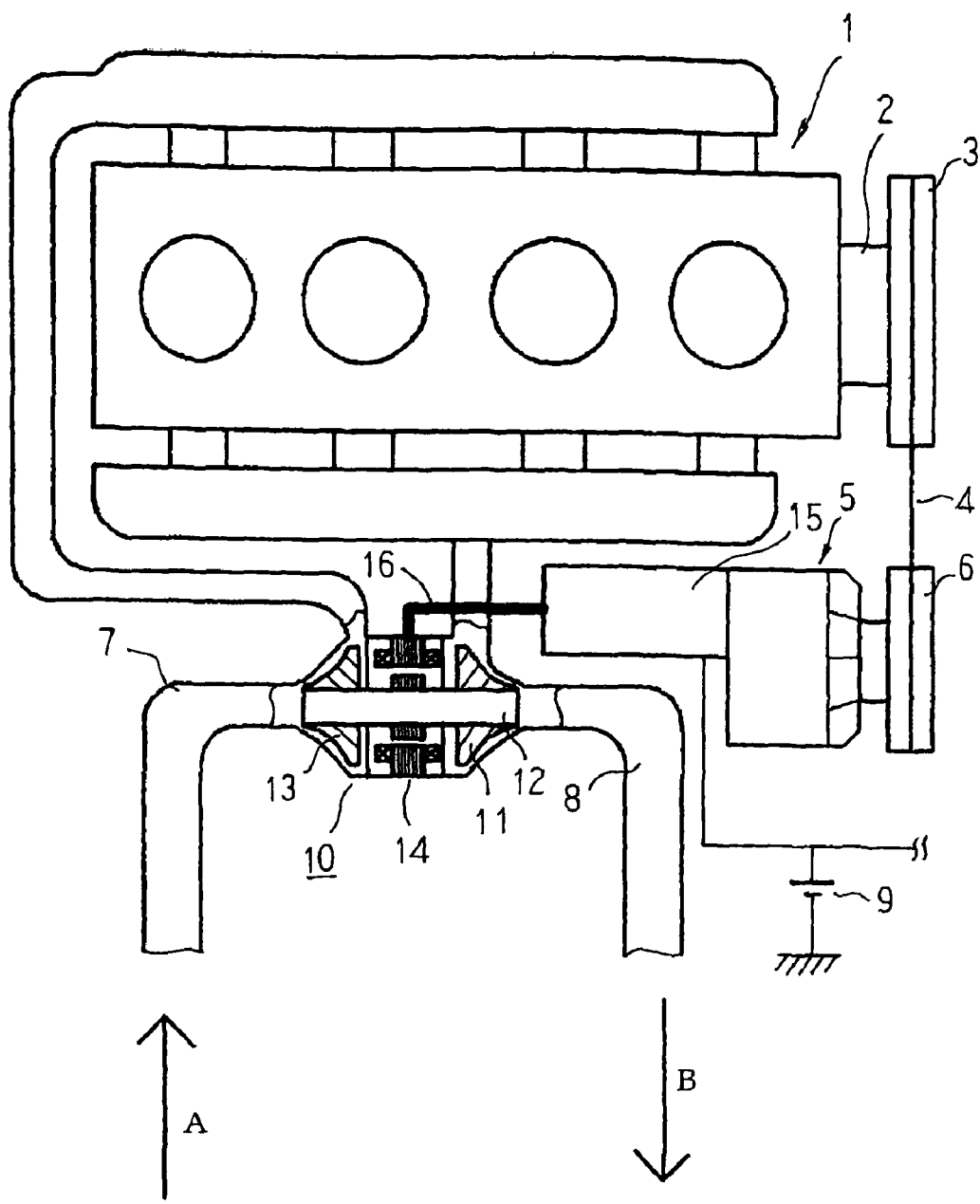
FIG. 1 is a schematic diagram that shows a configuration of an automotive hybrid engine assist system according to Embodiment 1 of the present invention.
Figure 2:
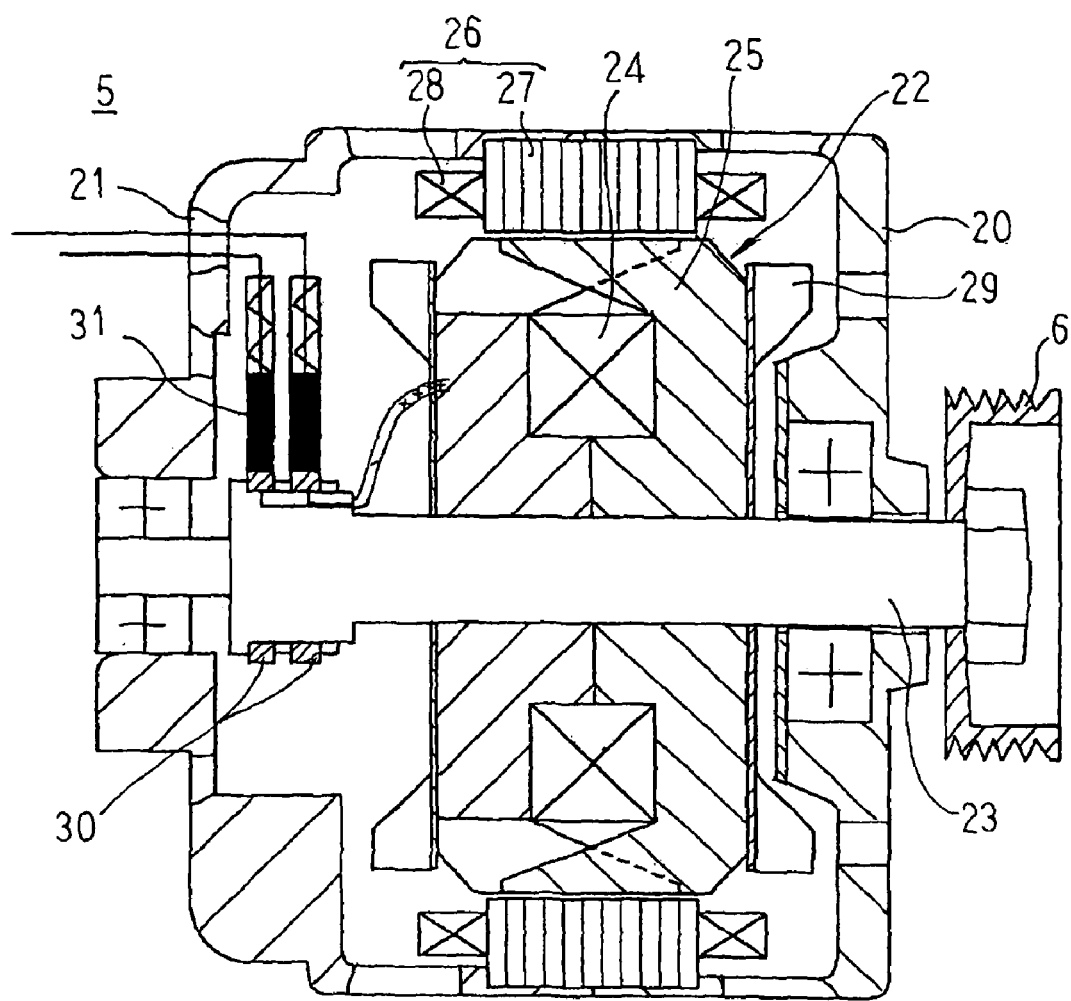
FIG. 2 is a cross section that shows a configuration of an electric motor-generator that can be used in the automotive hybrid engine assist system according to Embodiment 1 of the present invention.
Figure 3:
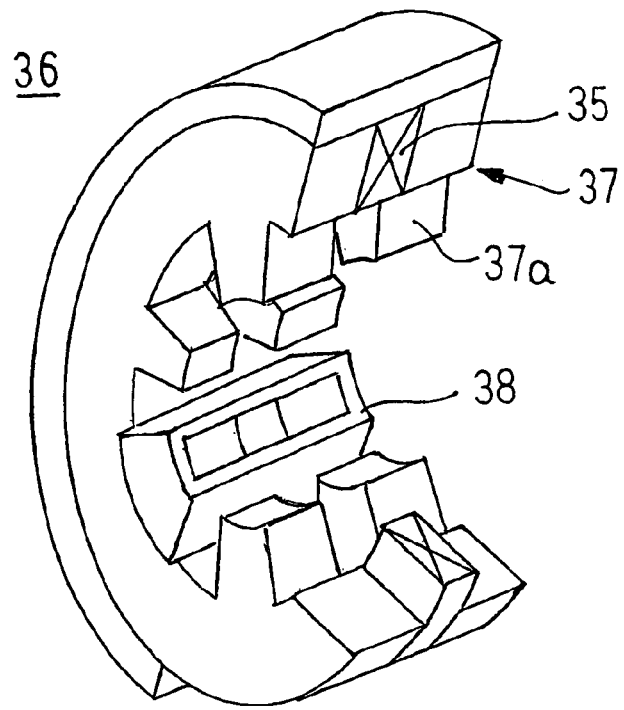
FIG. 3 is a partially cut away perspective that explains a stator configuration of a super-high-speed rotary machine that can be used in the automotive hybrid engine assist system according to Embodiment 1 of the present invention.
Figure 4:
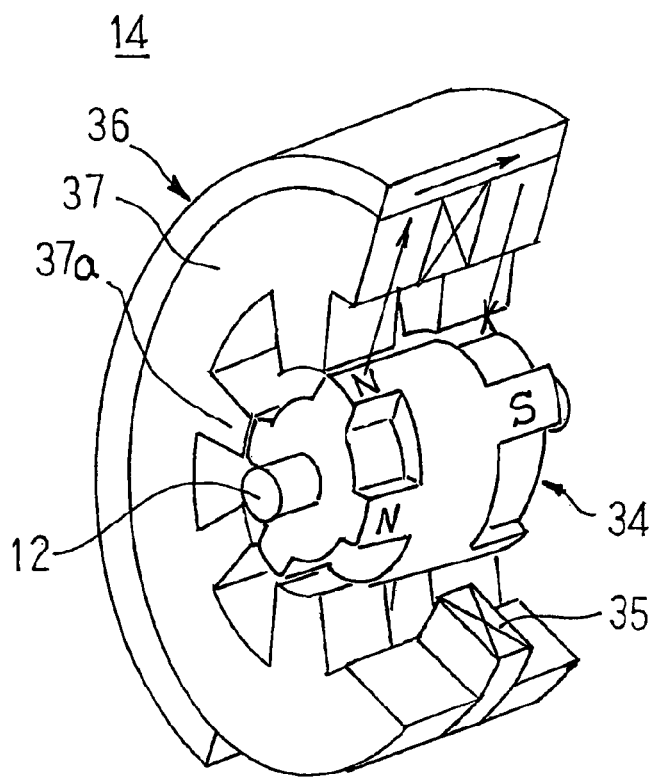
FIG. 4 is a partially cut away perspective that explains a configuration of the super-high-speed rotary machine that can be used in the automotive hybrid engine assist system according to Embodiment 1 of the present invention.
Figure 5:
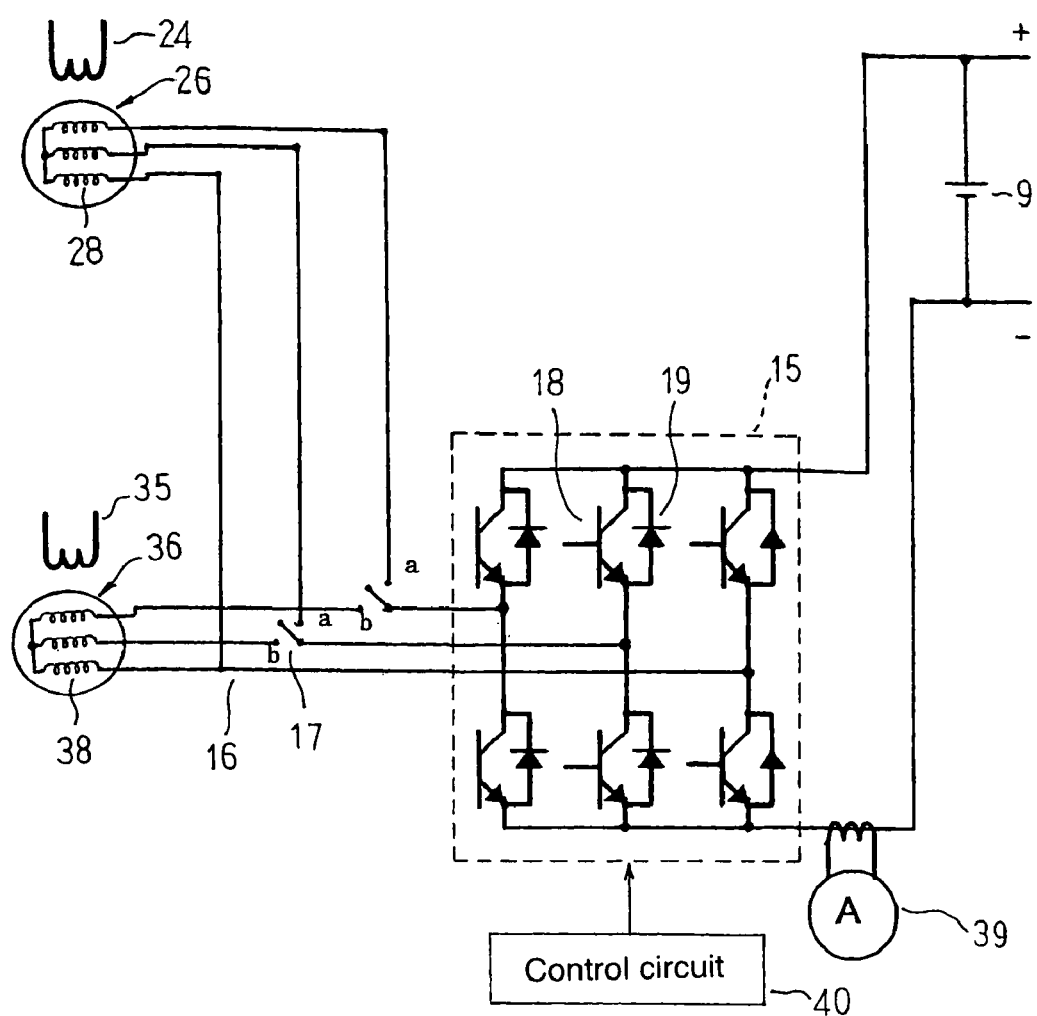
FIG. 5 is a schematic diagram that shows an electrical wiring circuit of the automotive hybrid engine assist system according to Embodiment 1 of the present invention.

FIG. 1 is a schematic diagram that shows a configuration of an automotive hybrid engine assist system according to Embodiment 1 of the present invention, FIG. 2 is a cross section that shows a configuration of an electric motor-generator that can be used in the automotive hybrid engine assist system according to Embodiment 1 of the present invention, FIG. 3 is a partially cut away perspective that explains a stator configuration of a super-high-speed rotary machine that can be used in the automotive hybrid engine assist system according to Embodiment 1 of the present invention, FIG. 4 is a partially cut away perspective that explains a configuration of the super-high-speed rotary machine that can be used in the automotive hybrid engine assist system according to Embodiment 1 of the present invention, and FIG. 5 is a schematic diagram that shows an electrical wiring circuit of the automotive hybrid engine assist system according to Embodiment 1 of the present invention. Moreover, only one armature coil is depicted in FIG. 3, and armature coils are omitted in FIG. 4.

In FIG. 1, an automotive hybrid engine assist system includes: a generator-motor 5 that is driven by rotational torque from an engine 1 that is an internal combustion engine; and a turbocharger 10 that is connected to an exhaust system of the engine 1.

A pulley 6 of the generator-motor 5 is linked to a pulley 3 that is fixed to a crankshaft 2 of the engine 1 by means of a belt 4. The generator-motor 5 converts driving force that is transmitted from the engine 1 by means of the belt 4 into alternating-current power. This alternating-current power is converted to direct-current power by an inverter 15 that is mounted integrally onto the generator-motor 5 at an opposite end from the pulley 6, and charges a battery 9 and is also supplied to an on-board load (not shown).

The turbocharger 10 has: a turbine 11 that is disposed in an exhaust system 8 of the engine 1; a compressor 13 that is fixed to a rotating shaft 12 of the turbine 11, and that is disposed in an induction system 7 of the engine 1; and a super-high-speed rotary machine 14 that is mounted coaxially onto the rotating shaft 12. The super-high-speed rotary machine 14 is electrically connected to the inverter 15 of the generator-motor 5 by means of large-current wiring 16. Moreover, in FIG. 1, a carburetor, and catalysts, etc., that are disposed in the induction system 7 and the exhaust system 8 have been omitted to facilitate explanation.

Now, intake gas A is supplied to the engine 1 by means of the induction system 7, and is combusted inside the engine 1. After combustion, exhaust gas B is discharged externally by means of the exhaust system 8. The turbine 11 is driven by the exhaust gas B that flows through the exhaust system 8. The compressor 13 that is fixed to the rotating shaft 12 of the turbine 11 is thereby driven to rotate, supercharging the intake gas A to greater than or equal to atmospheric pressure.

At this point, if the driver of the vehicle tries to accelerate by operating an accelerator, the reaction of the compressor 13 will be delayed because it will not be possible to provide sufficient power to the turbine 11 for approximately one or two seconds until the engine 1 is at greater than or equal to a predetermined rotational speed and the exhaust gas B obtains sufficient fluid power, giving rise to a phenomenon known as "turbo lag".

Here, direct-current power from the battery 9 is converted to alternating-current power by the inverter 15, and is supplied to the super-high-speed rotary machine 14 by means of the large-current wiring 16 to drive the super-high-speed rotary machine 14. Thus, at the low speeds at which turbo lag occurs, the rotating shaft 12 is subjected to a driving force even if sufficient fluid power cannot be achieved from the exhaust gas B, enabling the compressor 13 to be driven promptly, and suppressing the occurrence of turbo lag.

Here, the inverter 15 is disposed integrally on an end surface of the generator-motor 5 at an opposite end from the pulley 6. The generator-motor 5 is disposed such that the inverter 15 is in close proximity to a side surface on an exhaust side of the engine 1. In addition, the super-high-speed rotary machine 14 of the turbocharger 10 is disposed on a side surface on the exhaust side of the engine 1 in close proximity to the inverter 15.

Next, a configuration of the generator-motor 5 will be explained in detail based on FIG. 2.

The generator-motor 5 includes: a case that is constituted by a front bracket 20 and a rear bracket 21 that are each made of aluminum so as to have an approximate cup shape; a rotor 22 that is rotatably disposed inside the case such that a shaft 23 is supported by means of bearings in the case; a pulley 6 that is fixed to an end portion of the shaft 23 that projects outward at a front end of the case; fans 29 that are fixed to two end surfaces in an axial direction of the rotor 22; a stator 26 that is fixed to the case so as to surround an outer circumference of the rotor 22 so as to have a constant air gap relative to the rotor 22; a pair of slip rings 30 that are fixed to a rear end of the shaft 23, and that supply current to the rotor 22; and a pair of brushes 31 that are disposed inside the case so as to slide on the respective slip rings 30. Moreover, although not shown, a voltage regulator that adjusts magnitude of an alternating voltage generated in the stator 26 is disposed inside the case.

The rotor 22 includes: a field coil 24 that generates magnetic flux on passage of an excitation current; a pole core 25 that is disposed so as to cover the field coil 24 and in which magnetic poles are formed by that magnetic flux; and the shaft 23. The pole core 25 is fixed to the shaft 23, which is fitted through it at a central axial position. The stator 26 includes: a cylindrical stator core 27; and an armature coil 28 that is mounted to the stator core 27, and in which an alternating current arises due to changes in magnetic flux from the field coil 24 that accompany rotation of the rotor 22.

A generator-motor 5 that is configured in this manner is a field-controlled dynamoelectric machine in which generated power is adjustable using the field coil 24.

Next, a configuration of the super-high-speed rotary machine 14 will be explained in detail based on FIGS. 3 and 4.

The super-high-speed rotary machine 14 includes: a rotor 34 that is fixed coaxially onto the rotating shaft 12; and a stator 36 that is disposed so as to surround the rotor 34. The rotor 34 is constituted by a core in which salient poles are formed at a uniform angular pitch circumferentially such that there are four each on two axial ends so as to be offset by a pitch of half a salient pole from each other. The stator 36 is formed by laminating magnetic steel plates, and has: a stator core 37 in which six teeth 37a are arranged at a uniform angular pitch circumferentially; and an armature coil 38 in which three phases are wound in concentrated windings onto the six teeth 37a such that a sequence of U, V, and W is repeated twice. The stator 36 has a field coil 35, and as indicated by arrows in FIG. 4, produces a magnetic flux that flows radially outward from the rotor 34, subsequently flows axially, and then flows radially inward to return to the rotor 34. Because the salient poles of the rotor 34 are offset circumferentially by a pitch of half a salient pole, the magnetic flux acts such that North-seeking (N) poles and South-seeking (S) poles are disposed so as to alternate circumferentially when viewed from an axial direction.

A super-high-speed rotary machine 14 that is configured in this manner is a noncommutator motor, and, works magnetically in a similar manner to a concentrated winding permanent-magnet dynamoelectric machine that has eight poles and six slots. This super-high-speed rotary machine 14 is also a field-controlled dynamoelectric machine.

Moreover, in the super-high-speed rotary machine 14, the armature coil 38 is installed in the stator core 37 by a concentrated winding method, but the armature coil 38 may also be installed in the stator core 37 by a distributed winding method.

Next, a circuit configuration of the automotive hybrid engine assist system will be explained based on FIG. 5.

The inverter 15 is configured by forming sets in which switching elements 18 and diodes 19 that are connected in parallel to each other are connected in series, and arranging three such sets in parallel. Three-phase power terminals of the inverter 15 are connected to three-phase power terminals of the armature coil 28 of the generator-motor 5 and to three-phase power terminals of the armature coil 38 of the super-high-speed rotary machine 14 by means of the large-current wiring 16, and direct-current power terminals of the inverter 15 are connected to the battery 9. An electric power direction change-over switch 17 that switches the three-phase power terminals of the inverter 15 between the armature coil 28 of the generator-motor 5 (a side) or the armature coil 38 of the super-high-speed rotary machine 14 (b side) is disposed in the path of the large-current wiring 16. The electric power direction change-over switch 17 may also be disposed on all three phases, but in this case is disposed on only two phases.

An electric current detector 39 is disposed so as to be able to detect generated current. Moreover, the electric current detector 39 may also detect voltage by inserting a shunt resistance, or may also use any other method to detect the current or the voltage. The position at which the current or the voltage is detected may also be in a vicinity of the electric power direction change-over switch 17.

The switching actions of the respective switching elements 18 of the inverter 15 are controlled by commands from a control circuit 40. The switching action of the electric power direction change-over switch 17 is also similarly controlled by a command from the control circuit 40. The control circuit 40 also controls the voltage regulator to adjust the magnitude of the alternating-current voltage that is generated in the stator 26, and controls the field currents passed to the field coil 24 of the rotor 22 of the generator-motor 5 and the field coil 35 of the stator 36 of the super-high-speed rotary machine 14.

Figure 6:
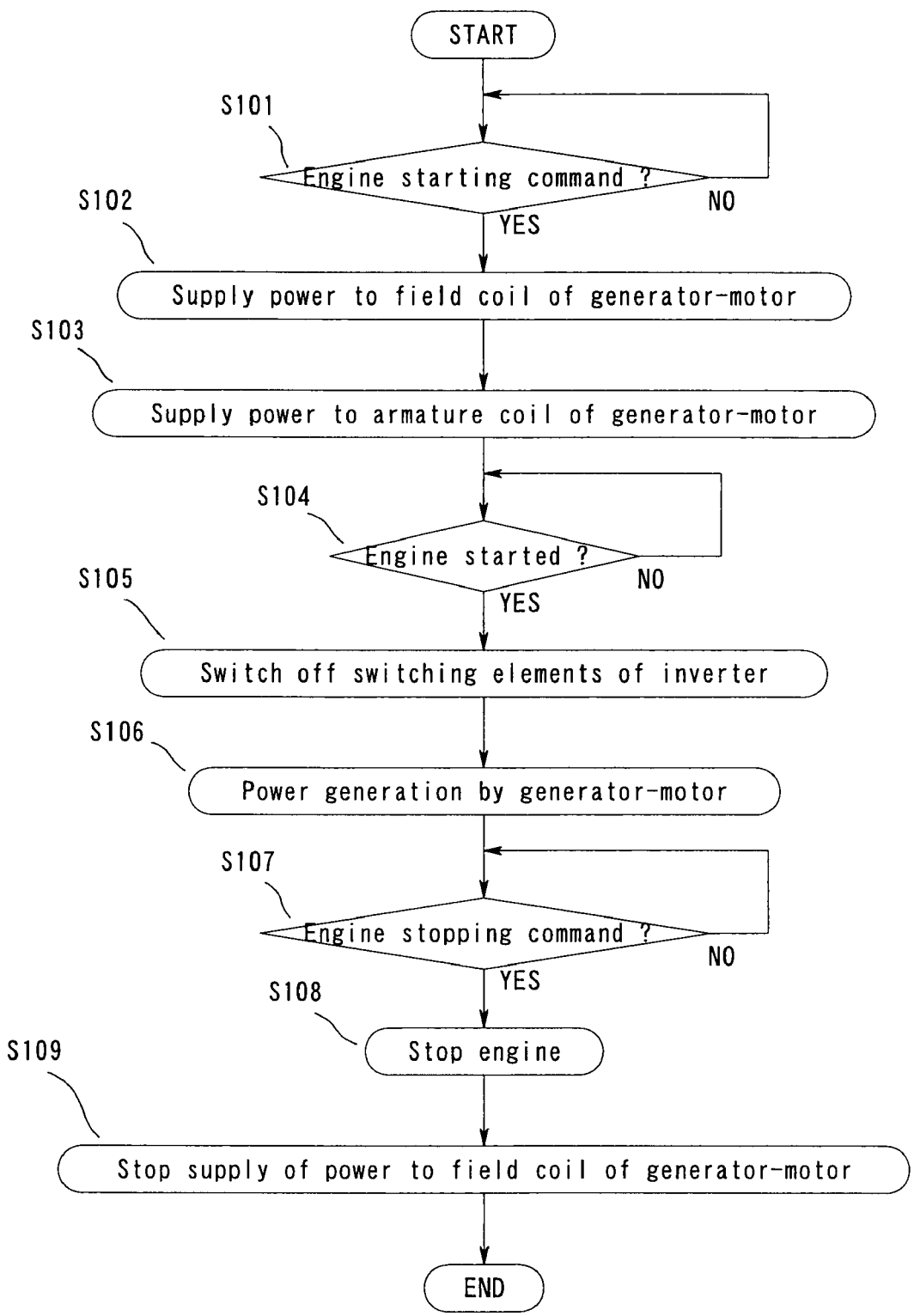
FIG. 6 is a flow chart that explains starting and generating actions in the automotive hybrid engine assist system according to Embodiment 1 of the present invention.

Next, starting and generating actions in an automotive hybrid engine assist system that is configured in this manner will be explained based on the flow chart that is shown in FIG. 6. Moreover, in FIG. 6, Steps 101 through 109 are indicated by S101 through 109.

The engine 1 is assumed to be stopped when the vehicle is stationary. In this state, the electric power direction change-over switch 17 is connected to the a side (to the generator-motor 5), and supply of electric power to the field coil 24 of the generator-motor 5 and the field coil 35 of the super-high-speed rotary machine 14 is stopped.

If there is a starting command for the engine 1 at Step 101, proceed to Step 102, where electric power is supplied to the field coil 24 of the generator-motor 5. Next, switching on and off of the switching elements 18 of the inverter 15 is controlled such that direct-current power from the battery 9 is converted to three-phase alternating-current power, and is supplied to the armature coil 28 of the generator-motor 5 by means of large-current wiring 16 (Step 103). The generator-motor 5 thereby functions as an electric motor, and the rotor 22 of the generator-motor 5 is driven to rotate. Rotational torque from the rotor 22 is transmitted to the engine 1 by means of the pulleys 3 and 6 and the belt 4 to drive the engine 1.

If starting of the engine 1 is detected at Step 104, rotational torque from the engine 1 is then transmitted to the generator-motor 5 by means of the pulleys 3 and 6 and the belt 4 to drive the generator-motor 5. Next, the switching elements 18 of the inverter 15 are switched off (Step 105), and alternating-current power that is induced in the armature coil 28 of the generator-motor 5 is converted to direct-current power by the inverter 15 to charge the battery 9 (Step 106). Here, the amount of power generated by the generator-motor 5 can be adjusted by adjusting the amount of electric current passed to the field coil 24 with the switching elements 18 of the inverter 15 switched off. Moreover, the amount of power generated by the generator-motor 5 can also be controlled by controlling switching on and off of the switching elements 18 of the inverter 15.

Next, at Step 107, determine whether there is a stopping command for the engine 1. If there is a stopping command for the engine 1, the engine 1 is stopped (Step 108). Then, supply of the electric power to the field coil 24 of the generator-motor 5 is stopped (Step 109).

Next, actions when the driver of the vehicle attempts rapid acceleration when the vehicle is running (corresponding to the state at Step 106) will be explained based on FIG. 7. Moreover, in FIG. 7, Steps 110 through 120 are indicated by S110 through 120.

The control circuit 40 determines whether an accelerator operating command, etc., which is an action command for the super-high-speed rotary machine 14, has been detected (Step 110). If the action command for the super-high-speed rotary machine 14 is detected, proceed to Step 111, and determine whether the voltage of the battery 9 is less than or equal to a predetermined value. If it is determined at Step 111 that the voltage of the battery 9 is less than or equal to the predetermined value, proceed to Step 120, and continue power generation by the generator-motor 5. If it is determined at Step 111 that the voltage of the battery 9 exceeds the predetermined value, proceed to Step 112, and stop the supply of electric power to the field coil 24.

Next, determine whether the detected value from the electric current detector 39 is less than or equal to a determining value (Step 113). Here, it is determined whether the current that flows to the electric power direction change-over switch 17 has decreased to a zero or weak current.

If it is determined at Step 113 that the detected value from the electric current detector 39 is less than or equal to the determining value, connect the electric power direction change-over switch 17 to the b side (Step 114). Next, supply electric power to the field coil 35 of the super-high-speed rotary machine 14, and control switching on and off of the switching elements 18 of the inverter 15 to convert direct-current power from the battery 9 into alternating-current power and supply it to the armature coil 38 of the super-high-speed rotary machine 14 (Step 115). Thus, the super-high-speed rotary machine 14 is driven, rotational speed of the turbocharger 10 becomes 100,000 to 200,000 rpm, and compression of the intake gas A is performed.

Next, determine whether the action command for the super-high-speed rotary machine 14 is continuing (Step 116). If it is determined that the action command of the super-high-speed rotary machine 14 has not continued, in other words, that compression of the intake gas A is in a satisfactory state, then stop the supply of electric power to the field coil 35 of the super-high-speed rotary machine 14, and switch off the switching elements 18 of the inverter 15 to stop the supply of electric power to the armature coil 38 (Step 117). The turbocharger 10 is thereby driven only by the exhaust gas B.

Next, determine whether the detected value from the electric current detector 39 is less than or equal to the determining value (Step 118). If it is determined at Step 118 that the detected value from the electric current detector 39 is less than or equal to the determining value, then connect the electric power direction change-over switch 17 to the a side (Step 119), and supply electric power to the field coil 24 of the generator-motor 5 to operate the generator-motor 5 as a generator (Step 120), and terminate the action command for the super-high-speed rotary machine 14. Alternating-current power that is induced in the armature coil 28 of the generator-motor 5 is thereby converted to direct-current power by the inverter 15 to charge the battery 9.

A case will now be explained in which the vehicle changes to high-speed motion or heavy-load motion when the turbocharger 10 is being driven only by the exhaust gas B at Step 117 above.

In high-speed motion or heavy-load motion of a vehicle, the exhaust gas B has a fluid energy that is greater than or equal to the power required by the turbocharger 10 for supercharging. In that case, electric power can be supplied to the battery 9 and the on-board load by operating the super-high-speed rotary machine 14 as a generator, and operating the inverter 15 in a regenerating mode. It is not necessary for the generator-motor 5 to perform power generation during that time.

By performing power generation using the turbocharger 10 and allowing the generator-motor 5 to rest in this manner, the effects described below are exhibited.

If 1 kW of electric power is to be supplied to a vehicle, for example, it is necessary to input approximately insert 3 to 10 kW of energy as fuel, because the thermal efficiency of the engine 1 is only approximately 10 to 30 percent. If power generation is performed by the super-high-speed rotary machine 14 using the exhaust gas B, however, waste energy that remains in the exhaust gas B after combustion can be reused. As a result, it is not necessary to input energy separately for the purpose of power generation, enabling fuel efficiency of the vehicle to be improved.

Figure 7:
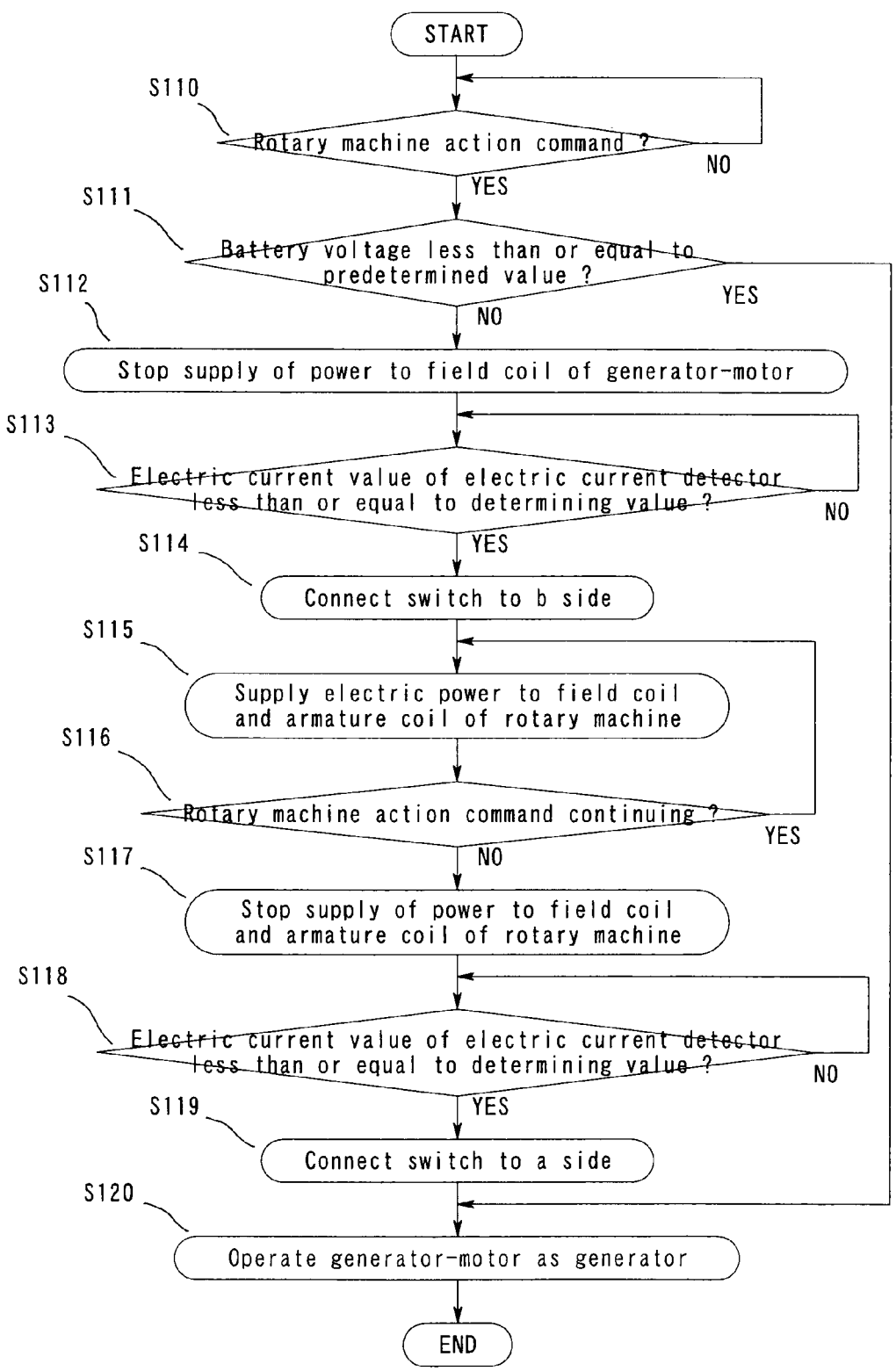
FIG. 7 is a flow chart that explains an engine assisting action in the automotive hybrid engine assist system according to Embodiment 1 of the present invention.

Moreover, FIG. 7 above represents the actions when low-speed motion or light-load motion continues, and the fluid energy in the exhaust gas B is small, or when power consumption by the on-board load is large, and the amount of power to be generated cannot be provided by the super-high-speed rotary machine 14 alone.

If the engine 1 is stopped at traffic lights, railroad crossings, etc., supply of electric power to the field coil 24 of the generator-motor 5 is stopped. If the electric power direction change-over switch 17 is still connected to the b side, switch the electric power direction change-over switch 17 to the a side after the detected value from the electric current detector 39 becomes less than or equal to the determining value. When the engine 1 is restarted, repeat the actions from Step 101 above.

In Embodiment 1, because the electric power direction change-over switch 17 is used to switch between connection between the inverter 15 and the generator-motor 5, and connection between the inverter 15 and the turbocharger 10, the generator-motor 5 and the turbocharger 10 can share the inverter 15, enabling the number of inverters 15 to be reduced. If the battery 9 is 12 V, wiring will be thick because a maximum 300 A class three-phase current flows through the large-current wiring 16. Because the inverter 15 is disposed integrally on an end surface of the generator-motor 5 at an opposite end from the pulley 6 and the generator-motor 5 is disposed on a side surface on an exhaust side of the engine 1 such that the inverter 15 is placed in close proximity to the super-high-speed rotary machine 14, wiring length of the large-current wiring 16 between the inverter 15 and the generator-motor 5 and also wiring length of the large-current wiring 16 between the inverter 15 and the super-high-speed rotary machine 14 can be shortened.

Because the number of inverters is reduced and the wiring length of the large-current wiring 16 is shortened in this manner, reductions in installation space, reductions in size and weight, and reductions in price are enabled. Thus, the idling reduction system and the electric motor turbocharging system can both be mounted even inside cramped engine compartments as follows.

The generator-motor 5 is driven by power from the engine 1, and the super-high-speed rotary machine 14 is driven by the exhaust gas B. Consequently, in systems from which the field cannot be removed, such as permanent magnets, a voltage is constantly generated by the inverter 15 due to reverse electromotive force from the rotor. Thus, when used with automobiles that have a wide rotational speed range, it is necessary to use an electric power direction change-over switch 17 and an inverter 15 that have a high voltage tolerance because voltages that are generated in the inverter 15 will increase in a high-speed region. In addition, it is necessary to use an arc-resistant electric power direction change-over switch 17 because if an electric current arises that flows through the electric power direction change-over switch 17 due to reverse electromotive force from the rotor, the electric power direction change-over switch 17 may be switched due to the passage of electric current, giving rise to an arc across the contacts of the electric power direction change-over switch 17.

In Embodiment 1, the generator-motor 5 and the super-high-speed rotary machine 14 are both field-controlled dynamoelectric machines, the supply of electric current to the field coils 24 and 35 of the generator-motor 5 and the super-high-speed rotary machine 14 is stopped during switching by the electric power direction change-over switch 17, and the switching operation of the electric power direction change-over switch 17 is performed after the current that flows to the electric power direction change-over switch 17 becomes a zero or weak current. Thus, the generation of voltages in the inverter 15 that result from reverse electromotive force from the rotor is suppressed, and the occurrence of arcing across the contacts of the electric power direction change-over switch 17 is prevented. Because voltage tolerances of the electric power direction change-over switch 17 and the inverter 15 can thereby be reduced, and arc resistance of the electric power direction change-over switch 17 can also be reduced, the electric power direction change-over switch 17 and the inverter 15 can be made compact and inexpensive, increasing mountability to automotive vehicles.

In addition, because the three-phase alternating-current power that is induced in the armature coil 28 of the stator 26 of the generator-motor 5 is converted into direct-current power using the inverter 15, a rectifying circuit that is constituted by a three-phase diode bridge is no longer necessary, enabling a compact and inexpensive generator-motor 5 to be achieved.

Embodiment 2

Figure 8:
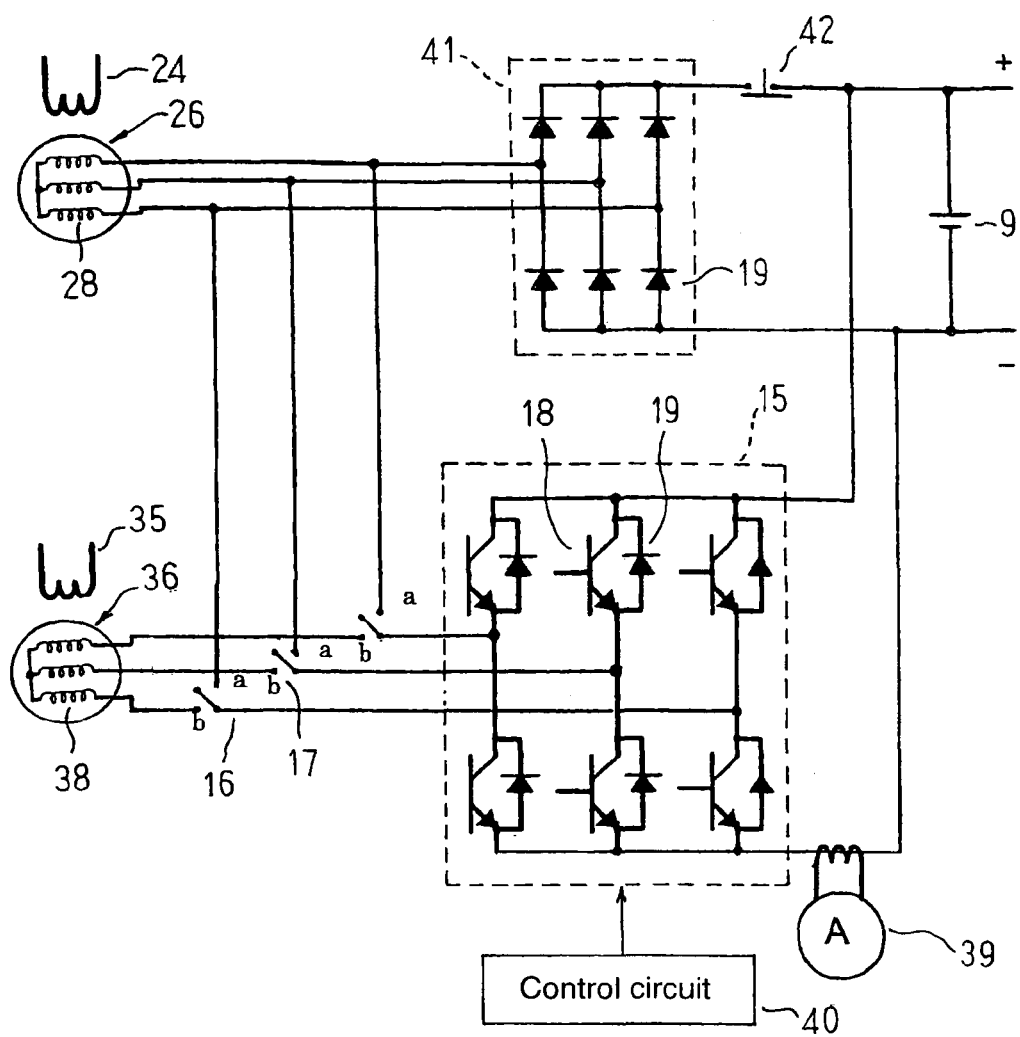
FIG. 8 is a schematic diagram that shows an electrical wiring circuit of an automotive hybrid engine assist system according to Embodiment 2 of the present invention.

FIG. 8 is a schematic diagram that shows an electrical wiring circuit of an automotive hybrid engine assist system according to Embodiment 2 of the present invention.

In FIG. 8, a rectifying circuit 41 is configured into a three-phase diode bridge by arranging in parallel three sets of diodes 19 that are connected in series. The rectifying circuit 41 is connected in parallel to an inverter 15 relative to a direct current (DC) linking portion, i.e., in parallel to the inverter 15 between three-phase power terminals of a generator-motor 5 and a battery 9. A switch 42 is disposed between the rectifying circuit 41 and the DC linking portion. An electric power direction change-over switch 17 is disposed on all three phases. The rectifying circuit 41 and the switch 42 are mounted internally into the generator-motor 5 so as to be adjacent to the inverter 15. Moreover, the rest of the configuration is configured in a similar manner to Embodiment 1 above.

Figure 9:
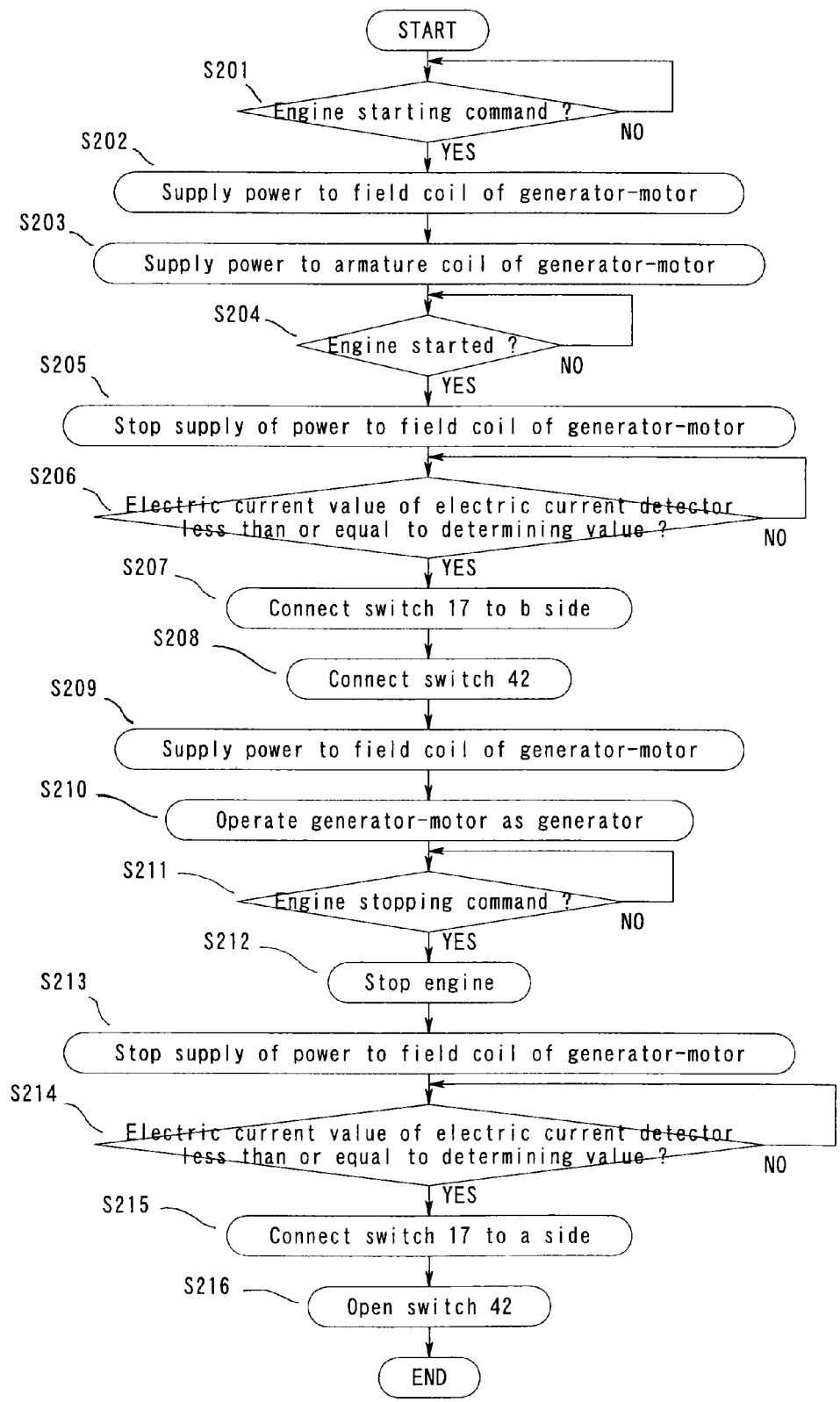
FIG. 9 is a flow chart that explains starting and generating actions in the automotive hybrid engine assist system according to Embodiment 2 of the present invention.

Next, starting and generating actions in an automotive hybrid engine assist system that is configured in this manner will be explained based on the flow chart that is shown in FIG. 9. Moreover, in FIG. 9, Steps 201 through 216 are indicated by S201 through 216.

The engine 1 is assumed to be stopped when the vehicle is stationary. In this state, the electric power direction change-over switch 17 is connected to the a side (to the generator-motor 5), supply of electric power to the field coil 24 of the generator-motor 5 and the field coil 35 of the super-high-speed rotary machine 14 is stopped, and the switch 42 is open.

If there is a starting command for the engine 1 at Step 201, proceed to Step 202, where electric power is supplied to the field coil 24 of the generator-motor 5. Next, switching on and off of the switching elements 18 of the inverter 15 is controlled such that direct-current power from the battery 9 is converted to three-phase alternating-current power, and is supplied to the armature coil 28 of the generator-motor 5 by means of large-current wiring 16 (Step 203). The generator-motor 5 thereby functions as an electric motor, and the rotor 22 of the generator-motor 5 is driven to rotate. Rotational torque from the rotor 22 is transmitted to the engine 1 by means of the pulleys 3 and 6 and the belt 4 to drive the engine 1. At this time, the diodes 19 of the rectifying circuit 41 are in a protected state because the switch 42 is open.

If starting of the engine 1 is detected at Step 204, proceed to Step 205, and stop the supply of electric power to the field coil 24. Next, determine whether the detected value from the electric current detector 39 is less than or equal to a determining value (Step 206). Here, it is determined whether the current that flows to the electric power direction change-over switch 17 has decreased to a zero or weak current.

If it is determined at Step 206 that the detected value from the electric current detector 39 is less than or equal to the determining value, connect the electric power direction change-over switch 17 to the b side (Step 207), and change the switch 42 to a connected state (Step 208). Next, electric power is supplied to the field coil 24 of the generator-motor 5 (Step 209). Rotational torque from the engine 1 is thereby transmitted to the generator-motor 5 by means of the pulleys 3 and 6 and the belt 4 such that the generator-motor 5 acts as a generator. Alternating-current power that is induced in the armature coil 28 of the generator-motor 5 is converted to direct-current power by the rectifying circuit 41 to charge the battery 9 (Step 210).

Next, at Step 211, determine whether there is a stopping command for the engine 1. If there is a stopping command for the engine 1, the engine 1 is stopped (Step 212). Then, supply of the electric power to the field coil 24 of the generator-motor 5 is stopped (Step 213). At this point, if electric power is being supplied to the field coil 35 of the super-high-speed rotary machine 14, the supply of electric power to the field coil 35 of the super-high-speed rotary machine 14 is also stopped. Next, determine whether the detected value from the electric current detector 39 is less than or equal to a determining value (Step 214). If it is determined at Step 214 that the detected value from the electric current detector 39 is less than or equal to the determining value, connect the electric power direction change-over switch 17 to the a side (Step 215), and open the switch 42 (Step 216).

Figure 10:
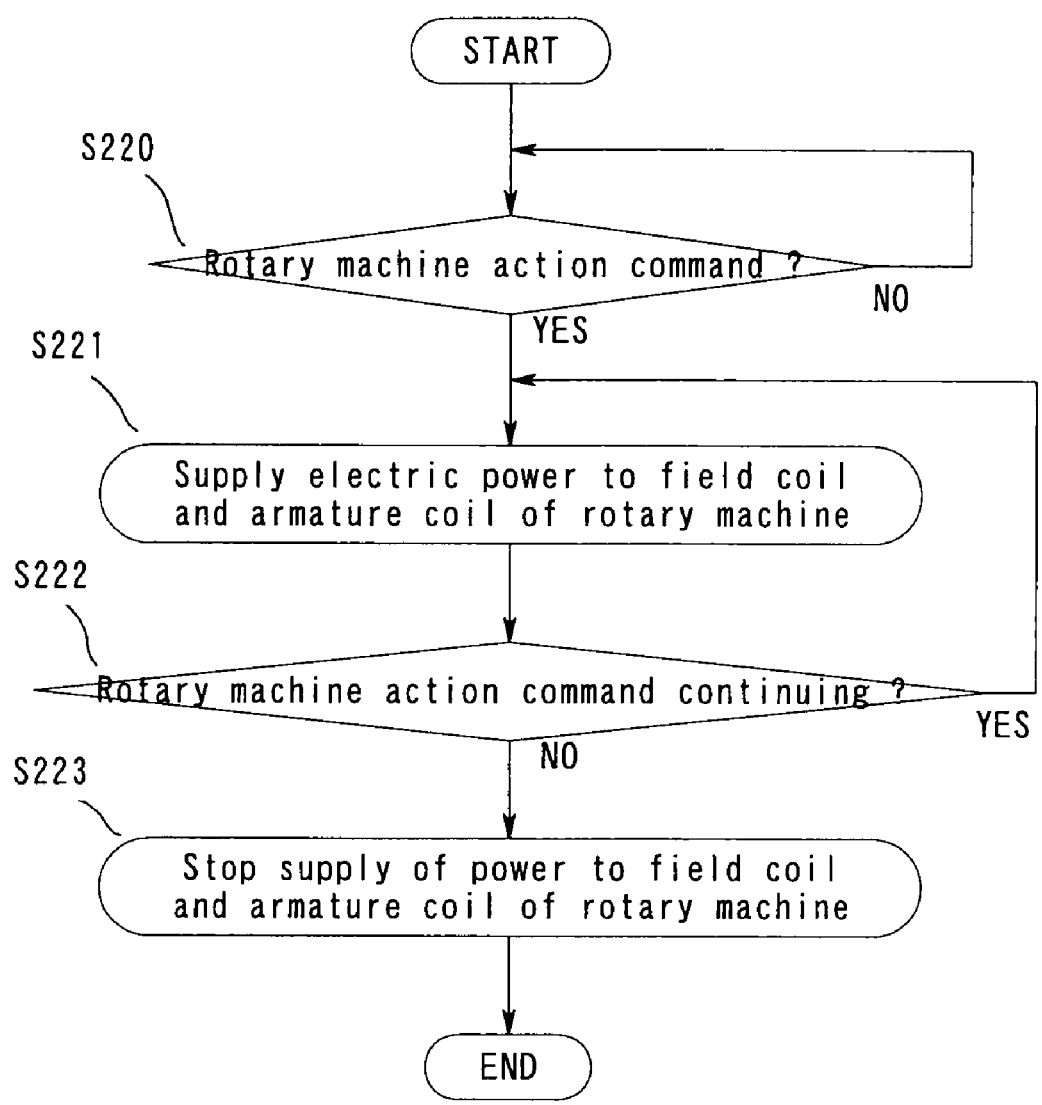
FIG. 10 is a flow chart that explains an engine assisting action in the automotive hybrid engine assist system according to Embodiment 2 of the present invention.

Next, actions when the driver of the vehicle attempts rapid acceleration when the vehicle is running (corresponding to the state at Step 210) will be explained based on FIG. 10. Moreover, in FIG. 10, Steps 220 through 223 are indicated by S220 through 223.

The control circuit 40 determines whether an accelerator operating command, etc., which is an action command for the super-high-speed rotary machine 14, has been detected (Step 220). If the action command for the super-high-speed rotary machine 14 is detected, supply electric power to the field coil 35 of the super-high-speed rotary machine 14, and control switching on and off of the switching elements 18 of the inverter 15 to convert direct-current power from the battery 9 into alternating-current power and supply it to the armature coil 38 of the super-high-speed rotary machine 14 (Step 221). Thus, the super-high-speed rotary machine 14 is driven, rotational speed of the turbocharger 10 becomes 100,000 to 200,000 rpm, and compression of the intake gas A is performed.

Next, determine whether the action command for the super-high-speed rotary machine 14 is continuing (Step 222). If it is determined that the action command of the super-high-speed rotary machine 14 has not continued, in other words, that compression of the intake gas A is in a satisfactory state, proceed to Step 223. At Step 223, stop the supply of electric power to the field coil 35 of the super-high-speed rotary machine 14, switch off the switching elements 18 of the inverter 15, and terminate the action command for the super-high-speed rotary machine 14. The turbocharger 10 is thereby driven only by the exhaust gas B.

Now, in a case in which the vehicle changes to high-speed motion or heavy-load motion when the turbocharger 10 is being driven only by the exhaust gas B at Step 223 above, electric power can be supplied to the battery 9 and the on-board load by operating the super-high-speed rotary machine 14 as a generator, and operating the inverter 15 in a regenerating mode.

If the engine 1 is stopped at traffic lights, railroad crossings, etc., supply of electric power to the field coil 35 of the super-high-speed rotary machine 14 is stopped. If the electric power direction change-over switch 17 is still connected to the b side, switch the electric power direction change-over switch 17 to the a side after the detected value from the electric current detector 39 becomes less than or equal to the determining value. When the engine 1 is restarted, repeat the actions from Step 201 above.

In Embodiment 2, the inverter 15 and the rectifying circuit 41 are connected in parallel relative to the DC linking portion, and the electric power direction change-over switch 17 is used to switch between connection between the inverter 15 and the generator-motor 5, and connection between the inverter 15 and the turbocharger 10. Thus, because electric power can be supplied to the super-high-speed rotary machine 14 from both the battery 9 and the generator-motor 5 by making the generator-motor 5 operate as a generator when supercharging of the intake gas A is required, load on the battery 9 is alleviated, enabling the 300A required to drive the turbocharger to be supplied without enlarging the battery 9.

The super-high-speed rotary machine 14 can be operated as a generator depending on the conditions of power generation demand by the on-board load. In that case, because electric power can be supplied to the on-board load from any one of the generator-motor 5, the battery 9, and the super-high-speed rotary machine 14, a large supply of electric power for the on-board load is possible.

Because power generation can be performed by the super-high-speed rotary machine 14 using waste energy that remains in the exhaust gas B after combustion, it is not necessary to input energy separately for the purpose of power generation, enabling fuel efficiency of the vehicle to be improved.

Increasing the number of turns in the armature coil 28 of the generator-motor 5 is an effective means for reducing the quantity of current in the inverter 15 during starting of the engine 1 to achieve reductions in the size of the inverter 15. However, if the number of turns in the armature coil 28 is increased, the impedance of the armature coil 28 will increase, giving rise to a reduction in the amount of power generated in the high-speed region. In Embodiment 2, reductions in the amount of power generated by the generator-motor 5 in the high-speed region can be compensated for by generating power using the super-high-speed rotary machine 14 in the high-speed region where the fluid energy of the exhaust gas B is large. Consequently, reductions in size and reductions in price of the inverter 15 can be achieved in an idling reduction system that uses the generator-motor 5.

Because the generator-motor 5 is coupled directly to the DC linking portion in parallel to the battery 9, increases in the size of the battery 9 can be avoided, enabling on-board space reduction and reductions in price.

In Embodiment 2, because the generator-motor 5 and the super-high-speed rotary machine 14 are also both field-controlled dynamoelectric machines, and the supply of electric current to the field coils 24 and 35 of the generator-motor 5 and the super-high-speed rotary machine 14 is also stopped, and the switching operation of the electric power direction change-over switch 17 is performed after the current that flows to the electric power direction change-over switch 17 becomes a zero or weak current, the electric power direction change-over switch 17 and the inverter 15 can be made compact and inexpensive, increasing mountability to automotive vehicles in a similar manner to Embodiment 1 above.

Embodiment 3

In Embodiment 3, a generator-motor assists an engine when a vehicle is in an idling standby state after engine starting in an automotive hybrid engine assist system according to Embodiment 1 above.

Now, in automatic transmission vehicles (AT vehicles), it can be determined that the vehicle is in an idling standby state when a position of an automatic transmission is Park (P) or Neutral (N), or when the position of the automatic transmission is changed from Park (P) to Reverse (R) to Neutral (N). The vehicle can be determined to be in the idling standby state when the position of the automatic transmission is P or N, because rotational torque from an engine 1 will not be transmitted through the gears to the tires. The vehicle can also be determined to be in the idling standby state when the position of the automatic transmission is changed from N to R to P if the engine 1 is running, because the vehicle will be stationary or in an idling standby state.

In manual transmission vehicles (MT vehicles), the vehicle can be determined to be in the idling standby state when the position of the shift lever is Neutral (N) and the hand brake is in an engaged state, since the engine 1 and gearbox are disconnected, the hand brake is engaged, and the vehicle is in a completely stationary state. Moreover, the control circuit 40 determines the idling standby state that is described above based on output from various kinds of sensors in the vehicle.

Figure 11:
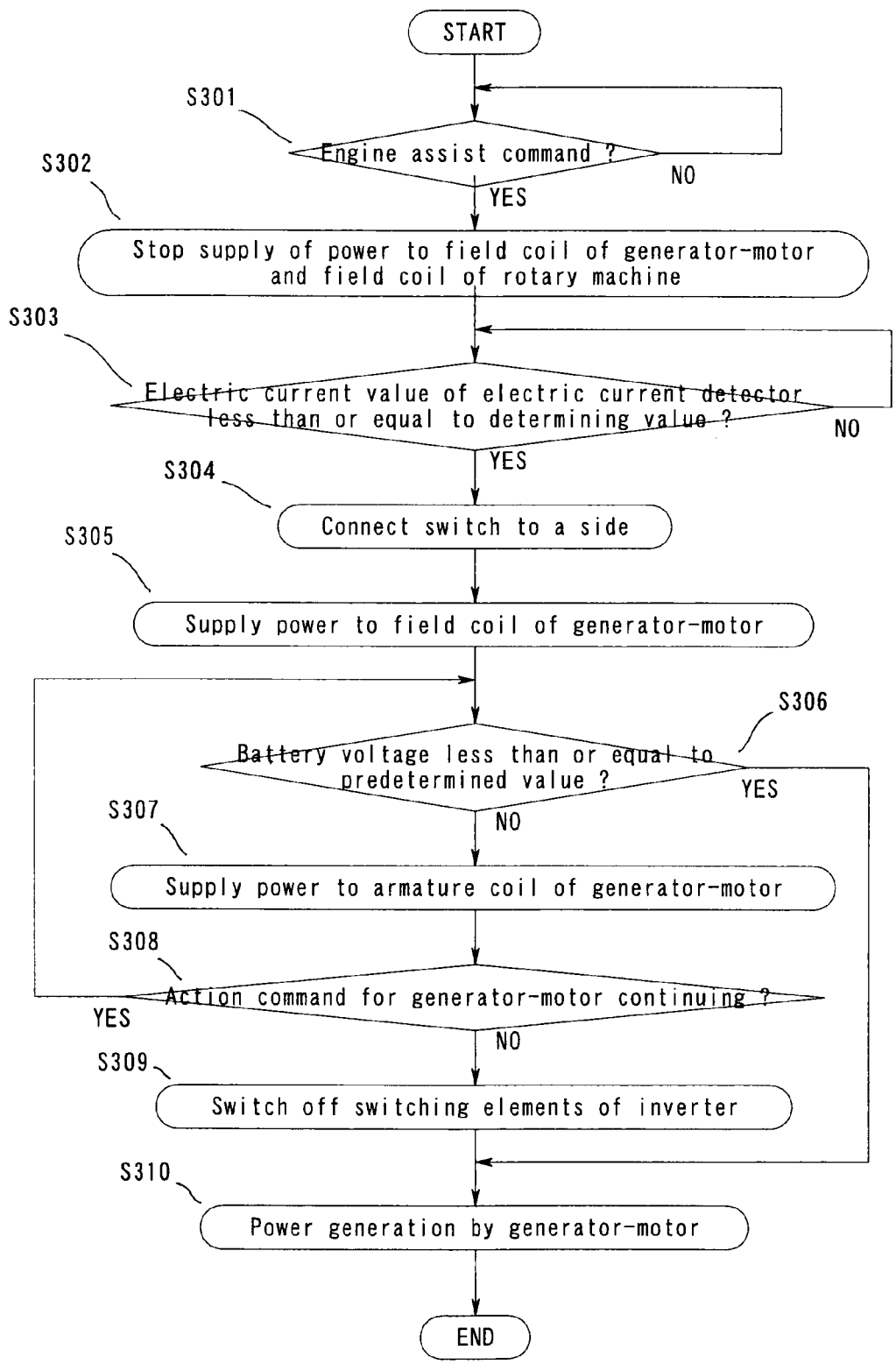
FIG. 11 is a flow chart that explains an engine assisting action in an automotive hybrid engine assist system according to Embodiment 3 of the present invention.

Next, actions of Embodiment 3 will be explained with reference to FIG. 11. Moreover, in FIG. 11, Steps 301 through 310 are designated S301 through 310.

First, the super-high-speed rotary machine 14 is assumed to be stopped in the idling standby state. If there is an engine assist action command at Step 301, proceed to Step 302, where power supply to the field coil 24 of the generator-motor 5 and the field coil 35 of the super-high-speed rotary machine 14 is stopped. Next, determine whether the detected value from the electric current detector 39 is less than or equal to a determining value (Step 303). If it is determined at Step 303 that the detected value from the electric current detector 39 is less than or equal to the determining value, connect the electric power direction change-over switch 17 to the a side (Step 304).

Next, supply power to the field coil 24 of the generator-motor 5 (Step 305), and determine whether the voltage of the battery 9 is less than or equal to a predetermined value (Step 306). If it is determined at Step 306 that the voltage of the battery 9 is less than or equal to the predetermined value, continue supplying power to the field coil 24 of the generator-motor 5, and continue power generation by the generator-motor 5 (Step 310). If it is determined at Step 306 that the voltage of the battery 9 exceeds the predetermined value, switching on and off of the switching elements 18 of the inverter 15 is controlled such that direct-current power from the battery 9 is converted to three-phase alternating-current power, and is supplied to the armature coil 28 of the generator-motor 5 by means of large-current wiring 16 (Step 307). The generator-motor 5 thereby functions as an electric motor, and the rotor 22 is driven to rotate. Rotational torque from the rotor 22 is transmitted to the engine 1 by means of the pulleys 3 and 6 and a belt.

Next, determine whether the action command for the generator-motor 5 is continuing (Step 308). If it is determined at Step 308 that the action command for the generator-motor 5 is continuing, then return to Step 306. If it is determined at Step 308 that the action command for the generator-motor 5 has not been continued, then switch off the switching elements 18 of the inverter 15 and stop the supply of power to the armature coil 28 (Step 309), and proceed to Step 310. The generator-motor 5 thereby functions as a generator. Then, switching on and off of the switching elements 18 is controlled such that alternating-current power that is induced in the armature coil 28 is converted to direct-current power and the battery 9 is charged.

Thus, according to Embodiment 3, by selectively using engine assist and power generating actions, it is possible to prevent reductions in battery voltage due to electrical component use in the idling state, enabling improvements in fuel consumption by the engine assist system.

Moreover, the engine assist action command that is described above is a command for the generator-motor 5 to assist the engine, and actions are performed by that command to assist engine rotation in the idling state using the generator-motor 5, reducing engine load in the idling state, and achieving improvements in fuel consumption.

Embodiment 4

In Embodiment 4, a generator-motor assists an engine when a vehicle is in an idling standby state after engine starting in an automotive hybrid engine assist system according to Embodiment 2 above. Determination of the idling standby state is similar to that of Embodiment 3 above. In Embodiment 4, it is possible to use the generator-motor 5 for engine assist and power generating actions, and also to use power generating actions of the super-high-speed rotary machine 14 and the generator-motor 5 selectively. By making both the super-high-speed rotary machine 14 and the generator-motor 5 act as generators, more rapid power generation becomes possible, enabling the amount of time that the engine assist system functions to be increased, thereby improving fuel efficiency.

Figure 12:
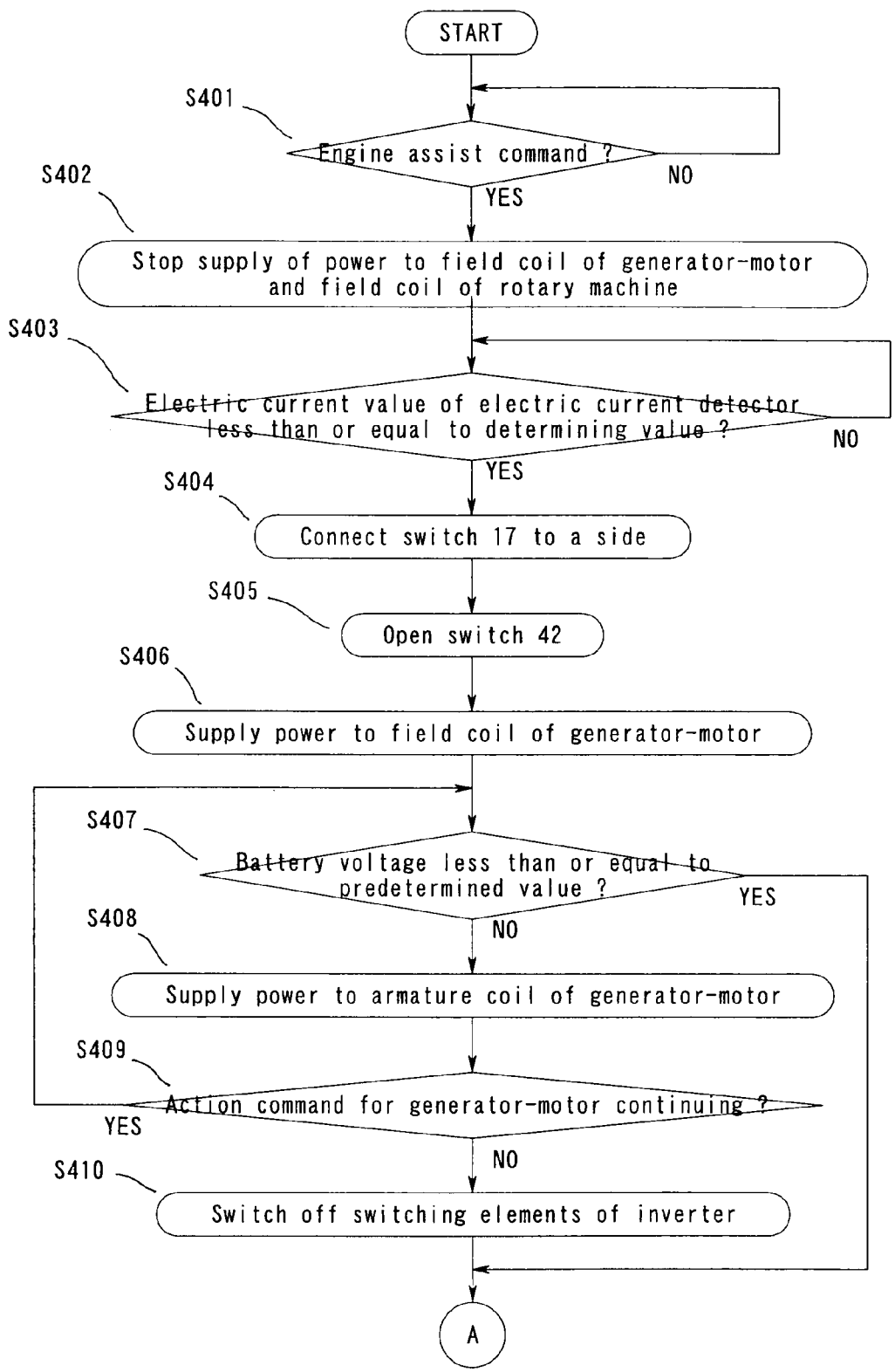
FIG. 12 is a flow chart that explains an engine assisting action in an automotive hybrid engine assist system according to Embodiment 4 of the present invention.
Figure 13:
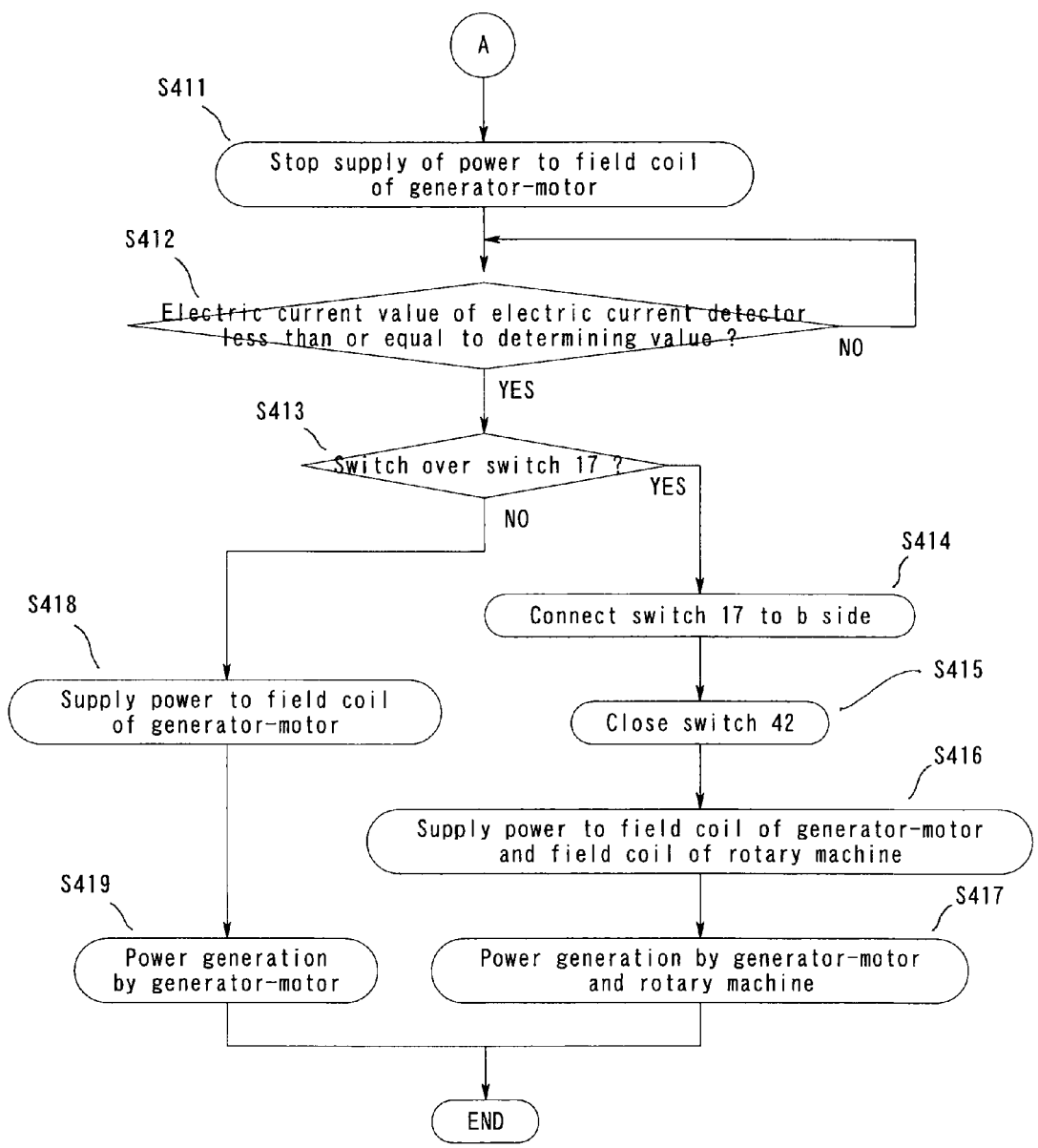
FIG. 13 is a flow chart that explains the engine assisting action in the automotive hybrid engine assist system according to Embodiment 4 of the present invention.

Next, actions of Embodiment 4 will be explained with reference to FIGS. 12 and 13. Moreover, in FIGS. 12 and 13, Steps 401 through 418 are designated S401 through 418.

First, the super-high-speed rotary machine 14 is assumed to be stopped in the idling standby state. If there is an engine assist action command at Step 401, proceed to Step 402, where power supply to the field coil 24 of the generator-motor 5 and the field coil 35 of the super-high-speed rotary machine 14 is stopped. Next, determine whether the detected value from the electric current detector 39 is less than or equal to a determining value (Step 403). If it is determined at Step 403 that the detected value from the electric current detector 39 is less than or equal to the determining value, connect the electric power direction change-over switch 17 to the a side (Step 404), and also open the switch 42 (Step 405).

Next, supply power to the field coil 24 of the generator-motor 5 (Step 406), and determine whether the voltage of the battery 9 is less than or equal to a predetermined value (Step 407). If it is determined at Step 407 that the voltage of the battery 9 is less than or equal to the predetermined value, proceed to Step 411.

If it is determined at Step 407 that the voltage of the battery 9 exceeds the predetermined value, switching on and off of the switching elements 18 of the inverter 15 is controlled such that direct-current power from the battery 9 is converted to three-phase alternating-current power, and is supplied to the armature coil 28 of the generator-motor 5 by means of large-current wiring 16 (Step 408). The generator-motor 5 thereby functions as an electric motor, and the rotor 22 is driven to rotate. Rotational torque from the rotor 22 is transmitted to the engine 1 by means of the pulleys 3 and 6 and a belt.

Next, determine whether the action command for the generator-motor 5 is continuing (Step 409). If it is determined at Step 409 that the action command for the generator-motor 5 is continuing, then return to Step 407. If it is determined at Step 409 that the action command for the generator-motor 5 has not been continued, then switch off the switching elements 18 of the inverter 15 and stop the supply of power to the armature coil 28 (Step 410), and proceed to Step 411.

At Step 411, when the supply of power to the field coil 24 of the generator-motor 5 is stopped, determine whether the detected value from the electric current detector 39 is less than or equal to a determining value (Step 412). If it is determined at Step 412 that the detected value from the electric current detector 39 is less than or equal to the determining value, determine whether or not to switch the electric power direction change-over switch 17 to the b side (Step 413). At Step 413, determine to switch the electric power direction change-over switch 17 to the b side if the battery voltage is greater than or equal to a predetermined value, and switch the electric power direction change-over switch 17 to the b side (Step 414), close the switch 42 (Step 415), and proceed to Step 416. At Step 416, supply power to the field coil 24 of the generator-motor 5 and the field coil 35 of the super-high-speed rotary machine 14 such that the generator-motor 5 and the super-high-speed rotary machine 14 perform power generating actions (Step 417).

At Step 413, determine not to switch the electric power direction change-over switch 17 to the b side if the battery voltage is lower than the predetermined value, and proceed to Step 418. At Step 418, supply power to the field coil 24 of the generator-motor 5 such that the generator-motor 5 performs a power generating action (Step 419).

Thus, according to Embodiment 4, it is possible to select between a power generating action by only the generator-motor 5, and power generating actions by the generator-motor 5 and the super-high-speed rotary machine 14.

In power generation by only the generator-motor 5, because the alternating-current power from the generator-motor 5 is converted into direct-current power by controlling switching on and off of the switching elements 18 of the inverter 15, generating efficiency is improved. The amount of power generated is also increased, enabling battery voltage to be increased to greater than or equal to a predetermined value in a short amount of time, increasing the amount of time that the engine assist system functions, and improving fuel efficiency.

In the power generation by the generator-motor 5 and the super-high-speed rotary machine 14, because the generated current is distributed, heat generation is dispersed, enabling modules to be reduced in size.

Moreover, in each of the above embodiments, the inverter 15 is disposed integrally on an end surface of the generator-motor 5 at an opposite end from the pulley 6, but the inverter 15 may also be disposed in a vicinity of the end surface of the generator-motor 5 at the opposite end from the pulley 6, or may also be disposed integrally inside the case of the generator-motor 5 at the opposite end from the pulley 6.

The invention claimed is:

1. An automotive hybrid engine assist system comprising:
   a generator-motor that is coupled to an internal combustion engine so as to act as a starter motor to start said internal combustion engine during starting of said internal combustion engine, and so as to be driven by said internal combustion engine to generate three-phase alternating-current power after starting of said internal combustion engine;
   a battery that constitutes a power source for a direct-current load and for starting;
   a turbocharger comprising:
      a compressor that is disposed in an induction system of said internal combustion engine, and that compresses intake gas;
      a turbine that is mounted coaxially onto a rotating shaft of said compressor, and that is disposed in an exhaust system of said internal combustion engine; and
      an electrical rotary machine that is mounted coaxially onto said rotating shaft;
   an inverter that is connected by wiring to three-phase power terminals of said generator-motor and three-phase power terminals of said electrical rotary machine, and that converts said three-phase alternating-current power that is generated by said generator-motor into direct-current power and supplies said direct-current power to said battery when connected to said generator-motor, and that converts direct-current power from said battery into three-phase alternating-current power and supplies said three-phase alternating-current power to said electrical rotary machine when connected to said electrical rotary machine; and
   an electric power direction change-over switch that is disposed in a path of said wiring, and that switches connection of said inverter to said generator-motor or to said electrical rotary machine.

2. An automotive hybrid engine assist system according to claim 1, wherein said generator-motor and said electrical rotary machine are field-controlled dynamoelectric machines that generate a main magnetic flux in a rotor by passing current to a field coil that is disposed in said rotor or a stator, and a switching action of said inverter is stopped and supply of electric power to said field coil is also stopped during a switching action of said electric power direction change-over switch.

3. An automotive hybrid engine assist system according to claim 1, wherein said inverter is disposed in close proximity to said generator-motor or integrally on said generator-motor, and said generator-motor is disposed on a side surface of said internal combustion engine such that said inverter is in close proximity to said electrical rotary machine.

4. An automotive hybrid engine assist system comprising:
   a generator-motor that is coupled to an internal combustion engine so as to act as a starter motor to start said internal combustion engine during starting of said internal combustion engine, and so as to be driven by said internal combustion engine to generate three-phase alternating-current power after starting of said internal combustion engine;
   a battery that constitutes a power source for a direct-current load and for starting;
   a turbocharger comprising:
      a compressor that is disposed in an induction system of said internal combustion engine, and that compresses intake gas;
      a turbine that is mounted coaxially onto a rotating shaft of said compressor, and that is disposed in an exhaust system of said internal combustion engine; and
      a rotary machine that is mounted coaxially onto said rotating shaft;
   an inverter that is connected by wiring to three-phase power terminals of said generator-motor and three-phase power terminals of said rotary machine, and that converts direct-current power from said battery into three-phase alternating-current power and supplies said three-phase alternating-current power to said generator-motor when connected to said generator-motor, and that converts direct-current power from said battery into three-phase alternating-current power and supplies said three-phase alternating-current power to said rotary machine when connected to said rotary machine;
   a rectifying circuit that is constituted by a three-phase diode bridge, that is connected in parallel to said inverter between said three-phase power terminals of said generator-motor and said battery, and that converts said three-phase alternating-current power that is generated by said generator-motor into direct-current power and supplies said direct-current power to said battery; and
   an electric power direction change-over switch that is disposed in a path of said wiring, and that switches connection of said inverter to said generator-motor or to said rotary machine.

5. An automotive hybrid engine assist system according to claim 4, wherein said generator-motor and said rotary machine are field-controlled dynamoelectric machines that generate a main magnetic flux in a rotor by passing current to a field coil that is disposed in said rotor or a stator, and a switching action of said inverter is stopped and supply of electric power to said field coil is also stopped during a switching action of said electric power direction change-over switch.

6. An automotive hybrid engine assist system according to claim 4, wherein said inverter is disposed in close proximity to said generator-motor or integrally on said generator-motor, and said generator-motor is disposed on a side surface of said internal combustion engine such that said inverter is in close proximity to said rotary machine.

7. An automotive hybrid engine assist system comprising:
   a generator-motor that is coupled to an internal combustion engine of an automotive vehicle so as to act as a motor to assist said internal combustion engine, or so as to be driven by said internal combustion engine to generate three-phase alternating-current power during idling standby;
   a battery that constitutes a power source for a direct-current load and for starting;
   a turbocharger comprising:
      a compressor that is disposed in an induction system of said internal combustion engine, and that compresses intake gas;
      a turbine that is mounted coaxially onto a rotating shaft of said compressor, that is disposed in an exhaust system of said internal combustion engine; and an electrical rotary machine that is mounted coaxially onto said rotating shaft;

an inverter that is connected by wiring to three-phase power terminals of said generator-motor and three-phase power terminals of said electrical rotary machine, and that converts said three-phase alternating-current power that is generated by said generator-motor into direct-current power and supplies said direct-current power to said battery, or converts direct-current power from said battery into three-phase alternating-current power and supplies said three-phase alternating-current power to said generator-motor, when connected to said generator-motor, and that converts direct-current power from said battery into three-phase alternating-current power and supplies said three-phase alternating-current power to said electrical rotary machine when connected to said electrical rotary machine; and an electric power direction change-over switch that is disposed in a path of said wiring, and that switches connection of said inverter to said generator-motor or to said electrical rotary machine.

8. An automotive hybrid engine assist system according to claim 7, wherein said automotive vehicle is an automatic transmission vehicle, and is determined to be in an idling standby state when a position of an automatic transmission is park or neutral.

9. An automotive hybrid engine assist system according to claim 7, wherein said automotive vehicle is an automatic transmission vehicle, and is determined to be in an idling standby state when a position of an automatic transmission is shifted from park through reverse to neutral.

10. An automotive hybrid engine assist system according to claim 7, wherein said automotive vehicle is a manual transmission vehicle, and is determined to be in an idling standby state when a position of a shift lever is neutral and a hand brake is engaged.

11. An automotive hybrid engine assist system comprising:

a generator-motor that is coupled to an internal combustion engine of an automotive vehicle so as to act as a motor to assist said internal combustion engine, or so as to be driven by said internal combustion engine to generate three-phase alternating-current power during idling standby;

a battery that constitutes a power source for a direct-current load and for starting;

a turbocharger comprising:

a compressor that is disposed in an induction system of said internal combustion engine, and that compresses intake gas;

a turbine that is mounted coaxially onto a rotating shaft of said compressor, and that is disposed in an exhaust system of said internal combustion engine; and a rotary machine that is mounted coaxially onto said rotating shaft;

an inverter that is connected by wiring to three-phase power terminals of said generator-motor and three-phase power terminals of said rotary machine, and that converts direct-current power from said battery into three-phase alternating-current power and supplies said three-phase alternating-current power to said generator-motor, or converts said three-phase alternating-current power that is generated by said generator-motor into direct-current power and supplies said direct-current power to said battery, when connected to said generator-motor, and that converts direct-current power from said battery into three-phase alternating-current power and supplies said three-phase alternating-current power to said rotary machine, or converts said three-phase alternating-current power that is generated by said rotary machine into direct-current power and supplies said direct-current power to said battery, when connected to said rotary machine;

a rectifying circuit that is constituted by a three-phase diode bridge, that is connected in parallel to said inverter between said three-phase power terminals of said generator-motor and said battery, and that converts said three-phase alternating-current power that is generated by said generator-motor into direct-current power and supplies said direct-current power to said battery; and an electric power direction change-over switch that is disposed in a path of said wiring, and that switches connection of said inverter to said generator-motor or to said rotary machine.

12. An automotive hybrid engine assist system according to claim 11, wherein said automotive vehicle is an automatic transmission vehicle, and is determined to be in an idling standby state when a position of an automatic transmission is park or neutral.

13. An automotive hybrid engine assist system according to claim 11, wherein said automotive vehicle is an automatic transmission vehicle, and is determined to be in an idling standby state when a position of an automatic transmission is shifted from park through reverse to neutral.

14. An automotive hybrid engine assist system according to claim 11, wherein said automotive vehicle is a manual transmission vehicle, and is determined to be in an idling standby state when a position of a shift lever is neutral and a hand brake is engaged.

* * * * *